United States Patent [19]

French et al.

[11] Patent Number: 4,952,164
[45] Date of Patent: Aug. 28, 1990

[54] PLUG-IN OUTLET UNIT FOR MODULAR FURNITURE POWER DISTRIBUTION SYSTEM

[75] Inventors: Ronald M. Weber, Lebanon; Jay L. French, Middletown; John L. Himes, Jr., Hummelstown; James H. Wise, Palmyra, all of Pa.

[73] Assignee: AMP Incorporated, Harrisburg, Pa.

[21] Appl. No.: 394,781

[22] Filed: Aug. 16, 1989

[51] Int. Cl.$^5$ ...................... H01R 25/16; H01R 23/02
[52] U.S. Cl. ...................................... 439/215; 439/652
[58] Field of Search ............... 439/652, 654, 650, 651, 439/653, 655, 207, 211, 212, 214–216

[56] References Cited

U.S. PATENT DOCUMENTS

| | | | |
|---|---|---|---|
| 4,277,123 | 7/1981 | Haworth et al. | 339/22 R |
| 4,313,646 | 2/1982 | Millhimes et al. | 339/156 R |
| 4,367,370 | 1/1983 | Wilson et al. | 174/48 |
| 4,666,223 | 5/1987 | Tillmann | 339/32 R |
| 4,684,186 | 8/1987 | Hetherington | 439/491 |
| 4,740,167 | 4/1988 | Millhimes et al. | 439/654 |
| 4,775,328 | 10/1988 | McCarthy | 439/211 |
| 4,781,609 | 11/1988 | Wilson et al. | 439/215 |

OTHER PUBLICATIONS

Advertising Bulletin for Esprit Seven.

Primary Examiner—Gary F. Paumen
Attorney, Agent, or Firm—Katherine A. Nelson

[57] ABSTRACT

An outlet unit for installation in a power distribution system for modular wall panel units carrying four separate pairs of line and neutral conductors. The outlet unit includes a pair of line and neutral contacts, configured to receive two separate plugs for power cords, the line and neutral contacts of the unit being connected to respective first and second contacts that project through the rear face of the outlet unit. The four pairs of line and neutral conductors of the distribution system are contained in an insulating power block housing having openings aligned with each of the conductors therein to provide access to the conductors by the first and second contacts of the outlet unit. The openings of the housing of the distribution system are arranged in two symmetrical groups. The outlet unit has four insulating silos positioned on its rear face so as to enter openings of either the first group or the second group, depending on the orientation of the outlet unit when plugged into the outlet unit. The first and second contacts of the outlet unit may be installed in the outlet unit so as to project into one of two pairs of silos. If the outlet unit contacts are installed in the first pair of silos, the unit may be plugged into the power block in a first orientation to connect the outlet unit to a first one of the pairs of line and neutral conductors of the system, or it may be plugged into the power block with a second orientation to connect the outlet unit to connect the outlet unit to a second of the pairs of line and neutral conductors of the system. If the outlet unit contacts are installed in the second pair of silos, the outlet unit may be plugged into the power block in first or second orientations to connect the outlet unit to the third or fourth pair of line and neutral conductors of the system, respectively.

16 Claims, 5 Drawing Sheets

PLUG-IN OUTLET UNIT FOR MODULAR FURNITURE POWER DISTRIBUTION SYSTEM

FIELD OF THE INVENTION

The present invention relates to a plug-in type outlet unit for use in a modular furniture power distribution system. More particularly, it relates to a duplex outlet unit adapted to plug-in installation in a modular furniture power distribution system, which unit is capable of supplying power through the outlet receptacle thereof from one selected pair of four separate line and neutral circuit pairs carried by the furniture power distribution system.

BACKGROUND OF THE INVENTION

Multi-circuit power distribution systems for modular wall panel units are disclosed in U.S. Pat. No(s). 4,367,370, issued Jan. 4, 1983; 4,740,167, issued Apr. 26, 1988 and 4,781,609, issued Nov. 1, 1988. Each of these systems include "power blocks", also termed "junction boxes" into which a duplex outlet may be plugged in one or both of its opposite faces. The power blocks of the systems of the referenced patents carry multiple circuits and the duplex outlets used in the systems employ various means for selecting a particular circuit, from amongst the several circuits available in a power block, to which that duplex outlet is to be connected.

For example, the systems of Pat. No(s). 4,367,370 and 4,740,167 receive power from a three phase, shared neutral, base power distribution system. The panel distribution systems each carry three line conductors and one neutral conductor. The duplex outlet units are connected between a selected one of the lines and neutral.

The duplex outlet unit used in the system of Pat. No. 4,367,370 has four male prongs which plug into the power block to contact individually the neutral and three line conductors therein. The outlet unit has an internal switch by which the line contacts, i.e., the outlet contacts for one side of an external load circuit, are connected to a selected one of the phases. Since all outlet units of the system are connected to the same neutral line, switching of the outlet contacts for the neutral side of an external load circuit is not required.

The system of Pat. No. 4,740,167 uses three different types of outlet units to connect the outlet units to the three separate lines of the system. The outlet units are basically the same and all use the same form of outlet housing and have male prongs for connecting the load circuit and load safety ground contacts of the outlet to the line, neutral and safety ground conductors of the system. The three types of outlet units differ from one another only in the placement of the outlet line prong so as to engage a different one of the three line contacts in the system power block, and in the configuration of the conductive strip that links the line prong of the outlet to the outlet contacts for the line side of an external load.

The system of U.S. Pat. No. 4,781,609 carries three separate pairs of line and neutral conductors to eliminate the sharing of a single neutral conductor by the loads connected to the three separate lines, as is done in the systems of the '370 and 167 patents. The outlet units used in the '609 system have a pair of contact prongs for engaging a selected pair of the three separate pairs of line and neutral conductors carried by the power block of the system. The outlet line and neutral prongs are slidably mounted in vertical alignment on the outlet unit to allow those prongs to be set in a position to engage a selected pair of line and neutral contacts from among the three vertically aligned pairs of line and neutral contacts on the power block.

It is an object of the invention to provide an outlet unit for use in a power distribution for modular furniture units and which may be selectively connected to a particular pair of line and neutral conductors from amongst the multiple pairs of line and neutral conductors carried by the panel power distribution system.

It is another object of the invention to provide a duplex outlet unit for use in such a power distribution system and which possesses increased reliability due to the elimination of slidable contacts therein for line and neutral pair selection.

It is a further and more specific object of the invention to provide a outlet unit for use in a power distribution system having four separate pairs of line and neutral conductors, which outlet unit may be connected to a selected pair of two of the available pairs of line and neutral conductors of the system and, by a simple modification of the outlet unit, may be connected to a selected pair of the remaining pairs of line and neutral conductors of the system.

SUMMARY OF THE INVENTION

Copending application Ser. No. 07/394,725, filed Aug. 16, 1989, and owned by the assignee of the present application, discloses a power distribution system for modular furniture having four separate pairs of line and neutral conductors. Each of the power blocks of the system carries ten flat, parallel, vertically aligned bus bars; one each for the four separate pairs of line and neutral conductors of the system, one for a safety ground and one for an isolated ground of the system. To conserve space, none of the bus bars in a power block has contacts formed thereon for engaging the contacts of a plug-in component used in the system, such as a cable connector or an outlet unit, shown representatively herein as a duplex outlet. The power blocks of the system have openings providing access to the bus bars therein by contacts of the plug-in components. The openings are arranged in patterns which, together with the low profile design of the contacts used by the plug-in components, enables the spacing between the bus bars of a power block to be such that the height of the power block does not exceed the limited space available in the wiring channels in panels of existing design.

The duplex outlet unit of the invention was designed for use in the power distribution system disclosed in application Ser. No. 07/394,591. The housing of the outlet unit is designed to accept two different configurations of contact pairs for engaging two different pairs of line and neutral bus bars in a power block of the system of the referenced application. When an outlet unit having the first configuration of contact pairs is plugged into a power block with the outlet unit in a first orientation, a first one of the four pairs of line and neutral bus bars in the power block will be engaged. When the same outlet unit is turned end for end or "flipped" to a second orientation and plugged into the power block, the second of the line and neutral bus bar pairs will be engaged.

When an outlet unit having the second configuration of contact pairs is plugged into a power block in a first orientation, the third pair of line and neutral bus bars of the power block will be engaged. When that same outlet unit is turned end for end to the second orientation and plugged into the power block, the fourth pair of line and neutral bus bars of the power block will be engaged.

DETAILED DESCRIPTION OF THE PREFERRED EMBODIMENT

Figure 1:
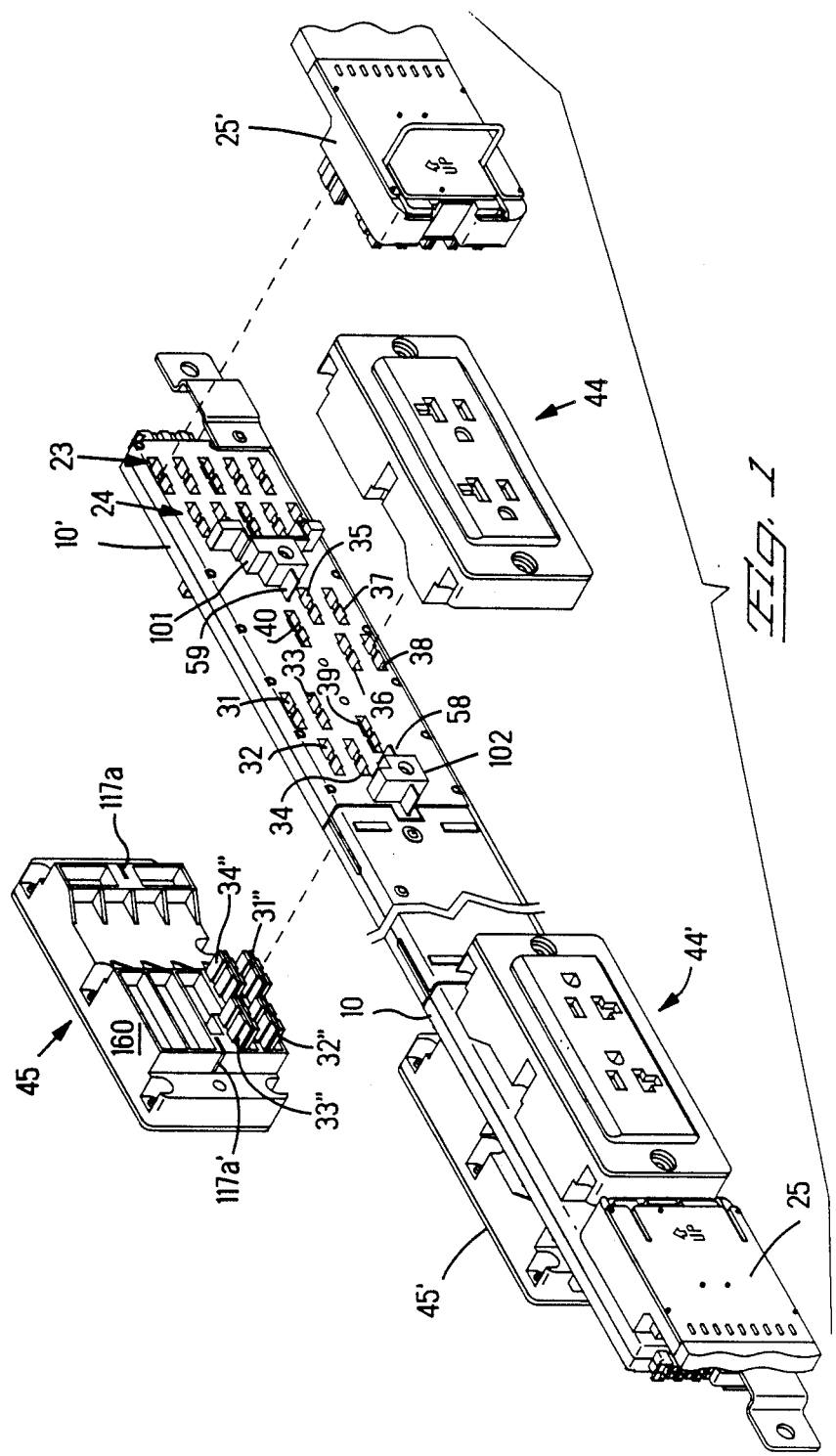
FIG. 1 is an isometriC drawing of the power distribution system of application Ser. No. 07/394,725 showing two of the duplex outlet units of the invention installed in the distribution system and two of the duplex outlet units positioned for installation in the system.

FIG. 1 is an isometric drawing of the power distribution system for modular wall panel units disclosed in application Ser. No. 07/394,775. The system includes identical power blocks 10, 10' installed at the opposite ends of a panel within the wiring channel that extends along the bottom edge of the panel. Duplex outlet units 44', 45' and panel to panel connector 25 are mounted in power block 10. Similiar duplex outlet units 44 and 45 and panel to panel connector 25 are exploded from power block 10'.

Figure 5:
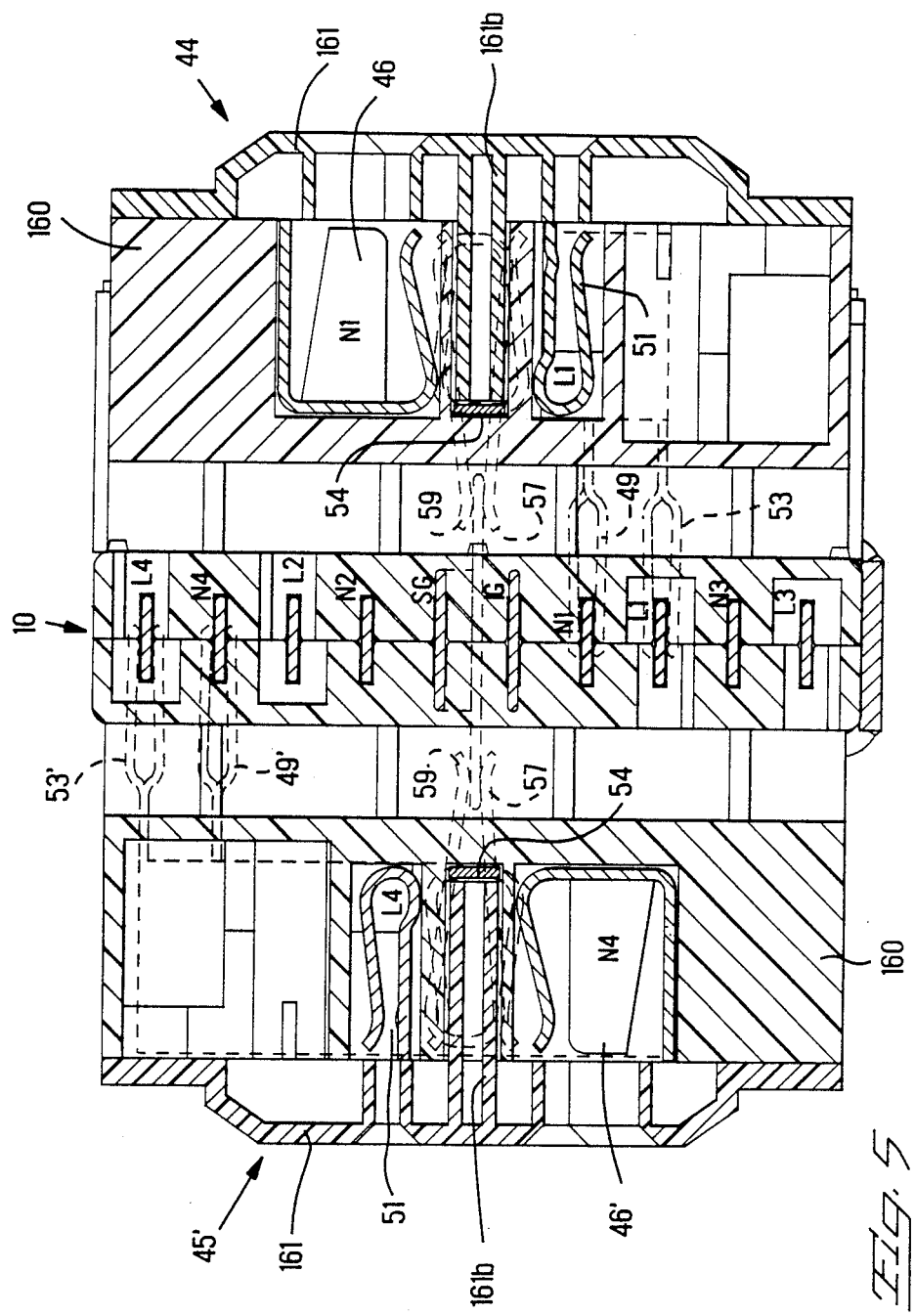
FIG. 5 is a vertical section through a power block of the distribution system in which an outlet unit of the type shown in FIG. 3 is installed in the right-hand face of the power block and an outlet unit of the type shown in FIG. 4 is installed in the left-hand face of the power block.

Each of the power blocks 10, 10' contains ten parallel, vertically aligned bus bars. Referring briefly to FIG. 5, the two centermost bus bars of the vertical array are the safety ground (SG) and isolated ground (IG) conductors of the system. For purposes of illustrating the invention, the four bus bars above the SG and IG bus bars are respectively, in descending order, the line 4 (L4), neutral 4 (N4), line 2 (L2) and neutral 2 (N2) conductors of the system. The four bus bars below the SG and IG bus bars are respectively, in descending order, the neutral 1 (N1), line 1 (L1), neutral 3 (N3) and line 3 (L3) conductors of the system.

Returning to FIG. 1, each of the opposite faces of power blocks 10, 10', at the end thereof, contains ten openings, as shown with respect to power block 10', arranged in two columns 23, 24 of five openings each, for providing access to the underlying bus bars by the ten contacts of a jumper cable connector 25. Jumper cables are used to interconnect the bus bars in a power block installed in one panel unit with like bus bars in a power block installed in an adjoining panel unit. A jumper cable connector 25 is shown installed in the left hand power block 10 and one is shown positioned for installation in the right hand power block 10'.

The mid-portion of each of the opposite faces of power blocks 10, 10', again shown with respect to power block 10', contain ten openings providing access to the bus bars of the power block by contacts of either a plug-in duplex outlet unit or a ten contact plug-in connector through which the bus bars of a power block are connected to the line, neutral and ground conductors of the base power distribution system. These ten openings are arranged in two groups of five openings each and the groups are symmetrically positioned in the upper left-hand and lower right-hand quadrants of both of the faces of the power block. Openings 31, 32, 33 and 34 of the upper group provide access, respectively, to the L4, N4, L2 and N2 bus bars of the power block. Openings 35, 36, 37 and 38 provide access, respectively, to the N1 L1 N3 and L3 bus bars of the power block. The remaining two openings 39, 40 are located on the horizontal centerline of the power block and provide access to SG and IG bus bars when a base power-in connector (not shown) is mounted to the power block. It is to be understood that the ten openings may alternatively be located in the upper right-hand and lower left-hand quadrants and in other such symmetrical arrangements that provide essentially the same capabilities of the present invention.

It is to be further understood that the location of the silos of the housing depends upon the pattern of openings in the power block and that the configuration of the mating face of the housing and shape of the contact members would be adjusted to accommodate different patterns of openings.

Four duplex outlet units 44, 44', 45 and 45', made in accordance with the invention, are shown. Outlet units 44 and 45 are shown installed in the left-hand power block 10 and outlet units 44' and 45' are shown positioned for installation in the right-hand power block 10'. As will shortly be completely described with reference to FIGS. 2-4, outlet units 44 and 45 are basically the same. Each outlet unit carries two male contacts for engaging a line/neutral pair of bus bars in a power block. Four insulating silos 31"-34" are molded on the rear face of the outlet unit housing in one quadrant thereof. The male contacts of outlet unit 44 project through the rear face of the housing 160 at the locations of silos 33" and 34" and are enclosed by those silos for protection against accidental touch. Similarly, the male contacts of outlet unit 45 extend through the rear face of housing 160 at the locations of silos 31" and 33" and are enclosed by those silos.

Outlet units 44 and 44' are identical. Outlet unit 44 is shown in a first orientation. When outlet unit 44 is installed in power block 10', silos 31"-34" respectively enter openings 38-35. Then the contacts contained by silos 33" and 34" will engage the L1 and N1 bus bars of power block 10'. Outlet unit 44' is outlet unit 44 turned end for end or flipped to a second orientation. In this orientation, silos 31"-34" enter the openings corresponding to the openings 31-34 of power block 10'. Only silos 33" and 34" of outlet unit 44' contains contacts and these will engage the L2 and N2 bus bars of power block 10.

Outlet units 45 and 45' are the same and differ only in that outlet unit 45' is outlet unit 45 turned end for end or flipped to the orientation corresponding to the orientation of outlet unit 44' for installation in the rear face of power block 10'. In the first orientation of outlet unit 45, the silos 31"-34" enter openings in the rear face of power block 10 corresponding to the openings 38-35 of power block 10' when installed in the rear face of the power block in the orientation shown. Turned end for end or flipped to the second orientation for installation in the rear face of power block 10', silos 31"–34" of unit 45' enter the openings therein corresponding to openings 31–34 in the front face of power block 10'. The silos 31" and 32" of outlet unit 45 carry male contacts and these will engage the L3 and N3 bus bars of a power block when outlet unit 45 is installed therein in the first orientation. Turned end for end to the second orientation shown for outlet unit 45' the male contacts contained by silos 31" and 32" will engage the L4 and N4 bus bars of a power block.

Thus, outlet unit 44 may be installed in either of the faces of either or both of the power blocks of the power distribution system of a wall panel unit and may be selectively connected to either the L1/N1 or to the L2/N2 conductors of the system, depending upon the orientation of outlet unit 44 when installed.

Similarly, outlet unit 45 may be installed in either of the faces of either or both of the power blocks of the power distribution system and may be selectively connected to either the L3/N3 or to the L4/N4 conductors of the system, depending upon the orientation of outlet unit 45 when installed.

Figure 2:
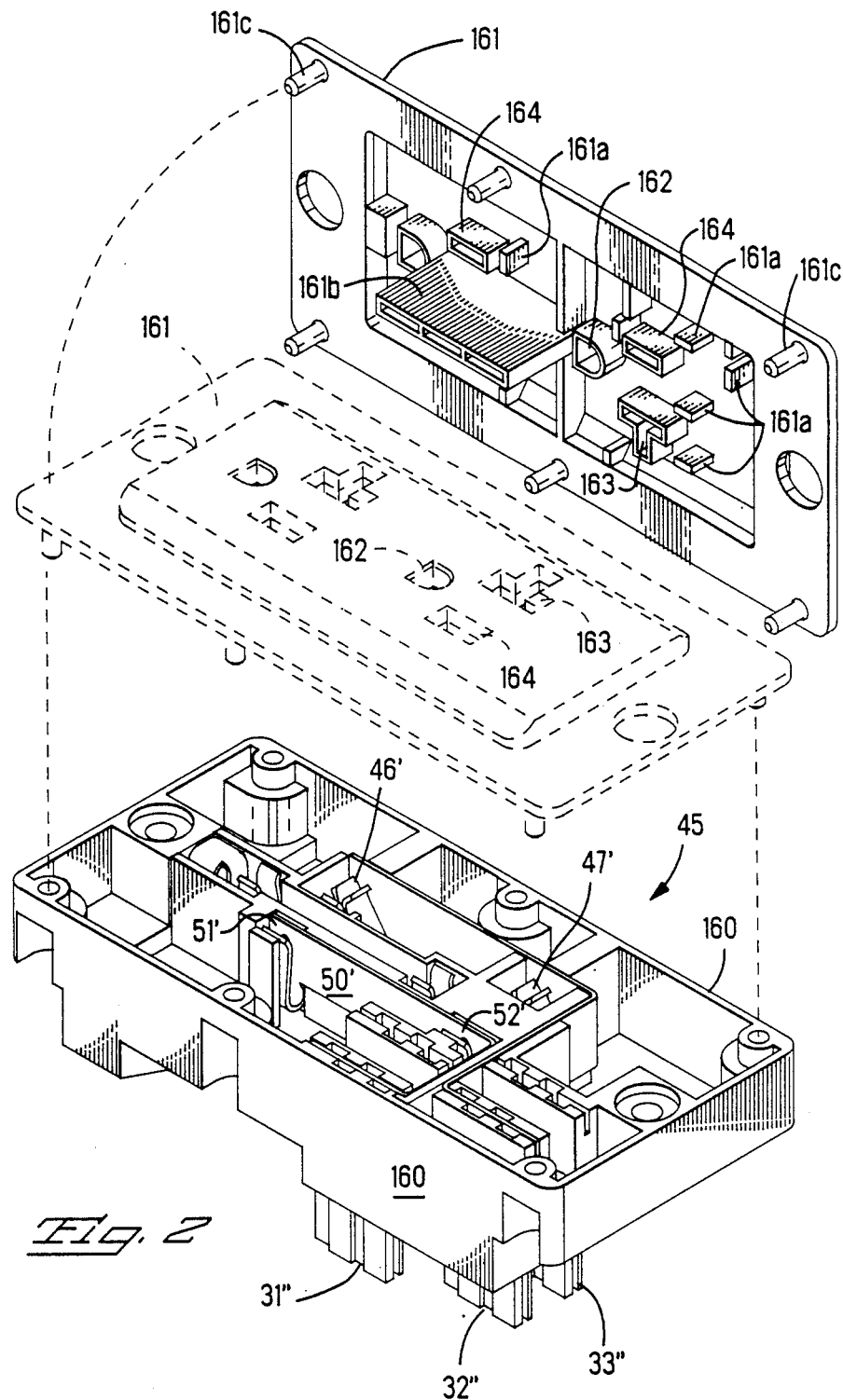
FIG. 2 is an isometric drawing of the duplex outlet unit of the invention with the front cover of the housing thereof separated from the base portion of the housing illustrating both the underside and outside of the cover.
Figure 3:
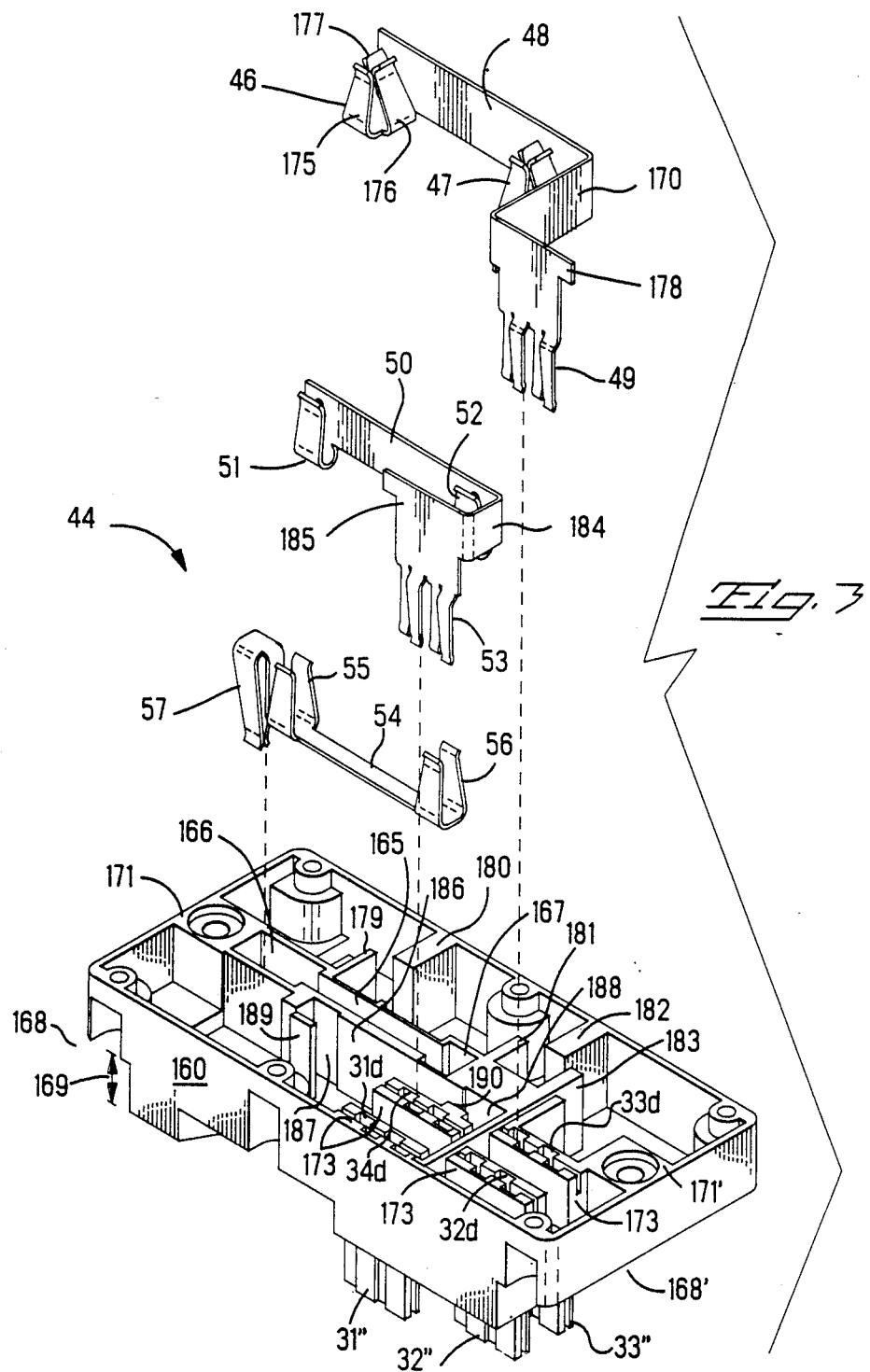
FIG. 3 is an isometric drawing of an exploded view of the base portion of the housing of a duplex outlet unit similiar to the one shown in FIG. 2 showing a modification in the form of the contacts used therein for connection of the outlet unit to one pair of two separate pairs of line and neutral conductors of the system.
Figure 4:
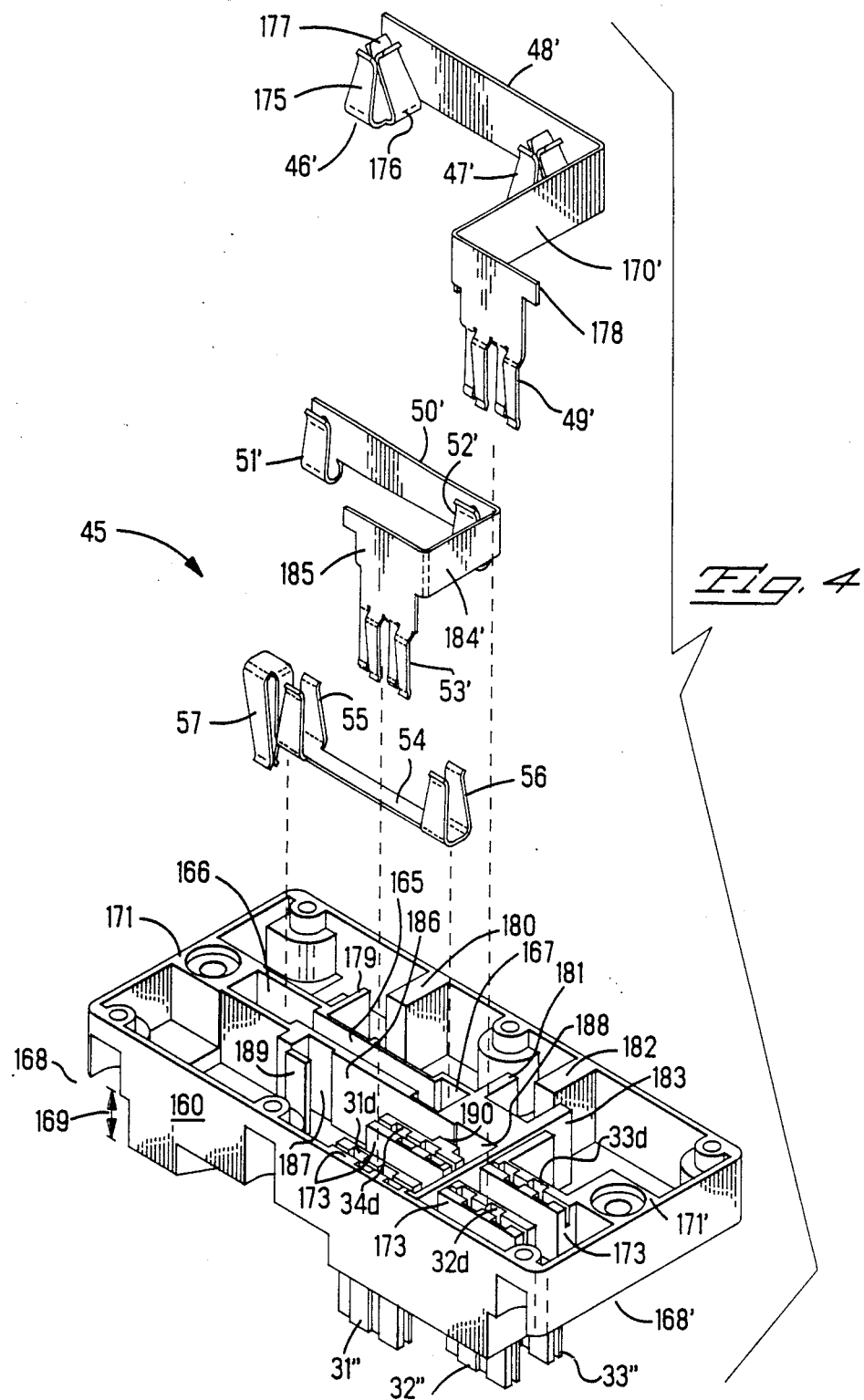
FIG. 4 is a drawing, similar to FIG. 3, showing the form of the outlet unit contacts of FIG. 2, used for connection of the outlet unit to one selected pair of two pairs of line and neutral conductors of the system different from the pairs of FIG. 3.

FIGS. 2–4 illustrate details of the construction of duplex outlet units 44 and 45. FIG. 2 is an isometric drawing of outlet unit 45 with the front cover removed. Both outlet units 44 and 45 use identical housings, comprising a base section 160 and a cover 161 molded from insulating material. Four insulating silos 31"–34" are molded onto the rear face of base 160 in one quadrant thereof. Only silos 31", 32" and 33" can be seen in FIGS. 2–4.

FIG. 2 shows receptacle 45 with its cover 161 in a rotated position to illustrate the underside and cover 161 (in phantom) exploded from base section 160. The cover 161 contains two identical sets of openings each of which sets includes a D-shaped opening 162, a T-shaped opening 163 and a rectangular opening 164 for accepting any of the common plug types, such as a two-prong, non-polarized plug; a two-prong, polarized plug or a three-prong grounded plug. The underside of cover 161 includes a plurality of pedestals 161a, 161b that extend into housing 160 and are configured to provide means for retaining respective contact members in the housing 160 and in electrical engagement with the selected bus bar members as plugs (not shown) are inserted and/or removed from the duplex receptacle. Cover 161 further includes staking posts 161c for securing cover 161 to base section 160. FIG. 5 shows respective pedestal 161b, in position against respective ground contact members 54.

FIG. 3 is an exploded view showing the base portion 160 of the outlet unit housing and the contacts of outlet unit 44 removed therefrom. A channel 165, having end portions 166, 167 of enlarged width, extends along the longitudinal center line of base 160.

Ground contacts 55–57, formed as an integral piece 54, fit into channel 165 with contacts 55 and 57 occupying channel portion 166 and contact 56 occupying channel portion 167. Contacts 55–57 are of U-shaped configuration with contacts 55 and 56 open to the face of the outlet unit in alignment with the openings 162 in the cover 161. Both ends of base 160 are stepped inward across the width of the base to create end ledges 168, 168' having a height 169 equal to the height of mounting posts 101 and 102 (FIG. 1) on the power block faces.

The interior of base 160 is thickened at the opposite ends along the center line of the base to provide strengthened mounting blocks 171, 171' having recessed holes therein through which fasteners are passed into posts 101, 102 to secure the outlet unit in place in a power block.

Referring briefly to FIG. 1, ground tangs 58 and 59 are formed on the safety ground (SG) bus bar of a power block and project through the face of a power block adjacent the facing sides of posts 101 and 102.

Returning to FIG. 3, the wall of mounting block 171 forming the end wall of channel portion 166 is slotted along the center line to allow entry of one of the ground tangs 58 or 59 (FIG. 1) into portion 166 when the outlet unit is installed in a power block. The slots 171a and 171a' for the entry of a ground tang 58 or 59 are also shown in FIG. 1. The downward facing ground contact 57 of the outlet unit then engages the portion of tang 58 or 59 protruding into channel portion 166.

Four generally rectangular shaped piers 173 extend upward from the floor of base 160, each in alignment with one of the silos 31"–34" projecting from the rear face of base 160. Slots 31d–34d extend through the piers 173 and open to the rear face of base 160 within the enclosures formed by silos 31"–34".

Contacts 46, 47 and 49 are formed as a unitary piece from strip 48. Contacts 46 and 47 are each comprised of three leaves 175–177 bent upward from the lower edge of strip 48 to converge at the outer ends thereof. Contacts 46 and 47 engage one of the prongs of a non-polarized plug between the under surface of leaf 175 and the outer edges of leaves 177 and 176. The prong of a polarized plug for connecting to a neutral line is engaged between the facing surfaces of leaves 176 and 177. The end of strip 48 extending beyond contact 47 is bent into an L-shape having a leg 170 extending transversely to the axis of contacts 46 and 47 and a leg 178 extending outward in a direction parallel to the axis of contacts 46 and 47. Contact 49 for engaging the N1/N2 bus bar of the power block is formed along and faces downward from the lower edge of leg 178. The contacts 46–49 fit into base 160 with contacts 46 and 47 in alignment with the T-slots 163 of cover 161. The portion of strip 48 connecting contacts 46 and 47 extends between the facing edges of partitions 179–183. The leg 170 runs along the wall of partition 183 and the leg 178 enters slot 33d along the edge thereof facing partition 183.

Contacts 51–53 are formed as a unitary piece from strip 50. Contacts 51 and 52 are each formed of a single leaf bent upward from the lower edge of strip 50 in facing relationship to strip 50. The portion of strip 50 extending beyond contact 52 is bent perpendicularly to the axis of contacts 51, 52 to form a leg 184 extending transversely to the axis of contacts 51, 52 and the end portion of leg 184 is bent back perpendicularly along a line parallel to the axis of contacts 51, 52 to form an end leg 185. Contact 53 projects downward from the lower edge of leg 185.

Contacts 51–53 fit into base 160 with the open ends of contacts 51 and 52 facing upward in alignment with slots 164 of cover 161. The portion of strip 50 connecting contacts 51 and 52 extends along the face of wall 186 forming one side of channel 165. Contacts 51 and 52 respectively fit into niches 187 and 188 in wall 186 and are held in position therein by post 189 which extends upward from the floor of base 160 opposite niche 187 and by ridge 190 formed on the face of the pier 173 opposite niche 188. Arm 184 extends along the internally facing wall of partition 183 and arm 185 enters 34d along the edge thereof adjacent the inwardly facing wall of partition 183.

Referring to FIG. 4, the assemblies of contacts 46', 47', 49' and 51', 52' in outlet unit 45 are of substantially the same form as the assemblies of contacts 46, 47, 49 and 51, 52 in outlet unit 44, except that the arms 170' and 184' shown in FIG. 4 are longer than the corresponding arms 170 and 184 shown in FIG. 3. When the assembly of contacts 46', 47' and 49' is installed in base 160 the disposition of contacts 46' and 47' in the base will be the same as the disposition of contacts 46 and 47 described with reference to FIG. 3. Because of the longer length of arm 170', however, contact 49' will be disposed in slot 32d, entering the slot from the end thereof adjacent the facing wall of partition 183.

Similarly, when the assembly of contacts 51'-53' is installed in base 160, the disposition of contacts 51' and 52' therein will be the same as the disposition of contacts 51 and 52 described with reference to FIG. 3. Again, because of the longer length of arm 184', contact 53' will be disposed in slot 31d, entering slot 31d through the end thereof adjacent the internally facing wall of partition 183. FIG. 2 shows duplex outlet unit 45 with the contact assemblies 46'-47' and 51'-52' and ground contact assembly 55-57 installed in base 160.

FIG. 5 is a vertical section taken through power block 10 with an outlet unit 44 of the type shown in FIG. 3 installed in the right-hand face of the power block and an outlet unit 45' of the type shown in FIG. 4 installed in the left-hand face of the power block. Contacts 49 and 53 of unit 44 are respectively installed in slots 33d and 34d (FIG. 3) and project into silos 33" and 34" (FIG. 1). Unit 44 is oriented for installation in power block 10 so that silos 31"-34" are positioned in the lower left quadrant of the rear face of the outlet unit, as viewed from the rear. With this orientation, silos 33" and 34" will enter power block openings 35 and 36 and contacts 49 and 53 will respectively engage the N1 and L1 bus bars of the system. The engagement of safety ground contact 57 with tang 59 of the SG bus bar is also seen in FIG. 5.

If outlet unit 44 had been turned to the second orientation (44') for installation in power block 10, with silos 31"-34" positioned in the upper right quadrant as seen from the rear, silos 33" and 34" would have entered power block openings 34 and 33, respectively, and contacts 49 and 53 would have engaged the N2 and L2 bus bars of the system.

In outlet unit 45', contacts 49' and 53' are respectively installed in slots 34d and 31d (FIG. 4) and project into silos 32" and 31" (FIG. 1). Outlet unit 45' is orientated for installation in power block 10 with silos 31"-34" positioned in the upper right quadrant of the rear face of the unit, as seen from the rear. With this orientation, silos 31" and 32" enter power block openings 31 and 32 and contacts 49' and 53' respectively engage the N4 and L4 bus bars of the system.

If outlet unit 45' had been oriented for installation in power block 10 with silos 31"-34" positioned in the lower left quadrant, as seen from the rear, silos 31" and 32" would have entered power block openings 38 and 37, respectively, and contacts 49' and 53' would have engaged the N3 and L3 bus bars of the system.

Obviously, many modifications and variations in the embodiment of the invention described herein are possible in the light of the above teachings. It is therefore to be understood that the invention may be practiced otherwise than as specifically disclosed without departing from the spirit and scope of the appended claims.

We claim:

1. An outlet unit for plug-in installation in a power distribution system for modular furniture units, said power distribution system including a power block having a housing containing at least two separate pairs of line and neutral conductors, said power block housing having a planar face with a plurality of openings therein, each of said openings being aligned with and providing access to a separate one of said line and neutral conductors in said housing, said openings being arranged in two groups, with the first of said groups of openings being positioned in one quadrant of said power block housing face and the second of said groups of openings being positioned in the quadrant of said housing face diagonally opposite said one quadrant, said outlet unit comprising:

an outlet unit housing having a front face and a rear face, said rear face confronting said face of said power block when said outlet unit is installed in said power block;

a plurality of insulating, hollow silos formed on said rear face and said outlet unit housing said projecting outward from said rear face, said silos all being located in the same quadrant of said rear face and being positioned to enter the openings of said first group of openings in said power block housing face;

a safety ground contact including first, second and third U-shaped contact sections, said ground contact being installed in said outlet unit housing along the longitudinal center line of said housing with said first and second contacts open toward said front face of said housing and said third contact open toward said rear face of said housing;

a line contact including fourth, fifth and sixth contact sections, said line contact being installed in said outlet unit housing with said fourth and fifth contact sections spaced laterally from the longitudinal center line of said housing and being open toward said front face of said housing and with said sixth contact section projecting through said rear face of said housing and into a first one of said silos on said rear face; and a neutral contact including seventh, eighth and ninth contact sections, said neutral contact being installed in said outlet unit housing with said seventh and eighth contact sections being spaced from the longitudinal center line of said housing opposite said line contact assembly and said seventh and eighth contact sections being open toward said front face of said housing and with said ninth contact projecting through said rear face of said housing and into a second one of said slice on said rear face.

2. An outlet unit as claimed in claim 1, wherein:

said openings of said first group of openings in said power block housing face and said openings of said second group of openings in said power block housing face are positioned synmetrically with one another;

a first and second one of said openings of said first group being respectively aligned with a first line conductor and a first neutral conductor of one of said pairs of line and neutral conductors in said power block;
a third and fourth one of said openings of said second group being respectively aligned with a second line conductor and a second neutral conductor of a second of said pairs of line and neutral conductors in said power block;
whereby said outlet unit may be oriented to a first position for installation in said power block with said first silo entering said first opening and said second silo entering said second opening and with said sixth and ninth contact section respectively contacting said first line and neutral conductors, or
said outlet unit may be oriented to a second position for installation in said power block with said first silo entering said third opening and said second silo entering said fourth opening and with said sixth and ninth contact section respectively contacting said second line and neutral conductors.

3. An outlet unit as claimed in claim 1, wherein:
said power block of said power distribution system contains four separate pairs of line and neutral conductors, and
said plurality of insulating silos and said rear face of said rear face of said outlet unit housing comprises four insulating silos,
said line contact being installed in said outlet unit housing with said sixth contact section thereof projecting into a third one of said silos on said rear face;
said neutral contact being installed in said housing with said ninth contact section thereof projecting into a fourth one of said silos;
a fifth and sixth one of said openings of said first group being respectively aligned with a third line conductor and a third neutral conductor of a third one of said pairs of line and neutral conductors in said power block; and
a seventh and eighth one of said openings of said second group being respectively aligned with a fourth line conductor and a fourth neutral conductor of the fourth one of said pairs of line and neutral conductors in said power block;
whereby said outlet unit may be oriented to a first position for installation in said power block with said third silo entering said fifth opening and said fourth silo entering said sixth opening and with said sixth and ninth contact sections respectively contacting said third line and neutral conductors, or
said outlet unit may be oriented to a second position for installation in said power block with said third silo entering said seventh opening and said fourth silo entering said eighth opening and with said sixth and ninth contact sections respectively contacting said fourth line and neutral conductors.

4. An outlet unit as claimed in claim 2, wherein:
said first group of openings in said power block face are positioned in the upper left-hand quadrant of power block face, when said power block face is viewed form the front, and
said insulating silos of said outlet unit are positioned in the upper right-hand quadrant of said rear face of said outlet unit housing, when said outlet unit is viewed from the rear.

5. An outlet unit for plug-in installation in a power distribution system,
said power distribution system including a power block having a housing containing four separate pairs of line and neutral conductors.
said power block housing having a plannar face with openings therein, each of said openings being aligned with and providing access to a separate one of said line and neutral conductors in said housing,
said openings being arranged in two groups, with the first of said groups of openings being positioned in one quadrant of said power block housing face and the second of said groups of openings being positioned in the quadrant of said housing face diagonally opposite said one quadrant,
said outlet unit comprising:
an outlet unit housing having a front face and a rear face, said rear face confronting said face of said power block when said outlet unit is installed in said power block;
four insulating, hollow silos formed on said rear face of said outlet unit housing and projecting outward from said rear face, said silos all being located in the same quadrant of said rear face and being positioned to enter the openings of said first group of openings in said power block housing face when said outlet is oriented to a first positions so that said quadrant of said rear face having said silos confronts said quadrant of said power block housing face having said first group of openings,
said silos entering said second group of openings in said power block face when said outlet unit is oriented to a second position so that said quadrant of said rear face having said silos confronts said quadrant of said power block housing having said second group of openings;
a safety ground contact assembly including first, second and third U-shaped contacts, said ground contact being installed in said outlet unit housing along the longitudinal center line of said housing with said first and second contact sections open toward said front face of said housing and said third contact section open toward said rear face of said housing;
a line contact including fourth, fifth and sixth contact sections, said line contact being installed in said outlet unit housing with said fourth and fifth contact sections spaced laterally from the longitudinal center line of said housing and being open toward said front face of said housing and with said sixth contact section projecting through said silos on said rear face;
and a neutral contact including seventh, eighth and ninth contact sections, said neutral contact being installed in said outlet unit housing with said seventh and eight contact sections being spaced from the longitudinal center line of said housing opposite said line contact and said seventh and eighth contact sections being open toward said front face of said housing and with said ninth contact sections projecting through said rear face of said housing and into a second one of said silos on said rear face.

6. An outlet unit as claimed in claim 5, wherein:
a first one of said line and neutral pairs of conductors of said power block extends parallel to the longitudinal center line of said power block and spaced above said center line with said line conductor of said first pair being above and adjacent to said neutral conductor of said first pair;

a second one of said line and neutral pairs of conductors of said power block extends parallel to the longitudinal center line of said power block and spaced below said center line with said line conductor of said second pair being below and adjacent to said neutral conductor of said second pair;

said first one of said insulating silos being the one of said silos that enters the one of said openings of said first group of openings in said power block face which is aligned with said line conductor of said first pair when said outlet unit is oriented to said first position;

and said second one of said silos being the one of said silos that enters the one of said first group of openings which is aligned with said neutral conductor of said first pair.

7. An outlet unit as claimed in claim 6, wherein:

the pattern of openings of said first group of openings and the pattern of openings of said second group of openings are symmetrical with one another, whereby said first silo enters the one of said openings of said second group which is aligned with said line conductor of said second pair and said second silo enters the one of said openings which is aligned with said neutral conductor of said second pair when said outlet unit is oriented to said second position.

8. An outlet unit as claimed in claim 6, wherein:

a third one of said line and neutral pairs of conductors of said power block extends parallel to the longitudinal center line of said power block and spaced above said first pair of line and neutral conductors with said line conductor of said third pair being above and adjacent to said neutral conductor of said third pair;

a fourth one of said line and neutral pairs of conductors of said power block extends parallel to the longitudinal center line of said power block and spaced below said second pair of line and neutral conductors with said line conductor of said fourth pair being below and adjacent to said neutral conductor of said fourth pair;

said sixth contact section of said outlet unit being installed in said outlet unit so that said sixth contact section projects through said rear face into a third one of said silos;

said ninth contact section of said outlet unit being installed in said outlet unit so that said ninth contact section through said rear face into the fourth one of said silos;

said third one of said insulating silos being the one of said silos that enters the one of said openings of said first group of openings in said power block face which is aligned with said line conductor of said third pair when said outlet unit is oriented to said first position;

and said fourth one of said silos being the one of said silos that enters the one of said first group of openings which is aligned with said neutral conductor of said third pair.

9. An outlet unit as claimed in claim 6, wherein:

the pattern of openings of said first group of openings and the pattern of openings of said second group of openings are symmetrical with one another, whereby said third silo enters the one of said openings of said second group which is aligned with said line conductor of said fourth pair and said fourth silo enters the one of said openings which is aligned with said neutral conductor of said fourth pair when said outlet unit is oriented to said second position.

10. An outlet unit as claimed in claim 9, wherein:

said first group of openings in said power block face are positioned in the upper left-hand quadrant of power block face, when said power block face is viewed from the front, and said insulating silos of said outlet unit are positioned in the upper right-hand quadrant of said rear face of said outlet unit housing, when said outlet unit is viewed from the rear.

11. An outlet unit for plug-in installation in a power distribution system for modular furniture units, said power distribution system including a power block having a housing containing at least two separate electrical circuits, said power block housing having a planar face with at least one opening therein, aligned with and providing access to a separate one of said circuits in said housing, said openings being arranged in two groups, with the first of said groups of openings being positioned in one quadrant of said power block housing face and the second of said groups of openings being positioned in the quadrant of said housing face diagonally opposite said one quadrant, said outlet unit comprising:

an outlet unit housing having a front face and a rear face, said rear face confronting said face of said power block when said outlet unit is installed in said power block;

a plurality of insulating, hollow silos formed on said rear face of said outlet unit housing and projecting outward from said rear face, said silos all being located in the same quadrant of said rear face and being positioned to enter the openings of said first group of openings in said power block housing face;

a ground contact including a plurality of contact sections associated with one another, said ground contact being installed in said outlet unit housing along the longitudinal center line of said housing with at least one of said plurality of ground contact sections open toward said front face of said housing and another of said plurality of ground contact sections being open toward said rear face of said housing;

a line contact including a plurality of line contact sections associated with one another, said line contact being installed in said outlet unit housing with at least one of said line contact sections spaced laterally form the longitudinal center line of said housing and being open toward said front face of said housing and with another of said line contacts projecting through said rear face of said housing and into a first one of said silos on said rear face; and a neutral contact including a plurality of neutral contact sections associated with one another, said neutral contact being installed in said outlet unit housing with at least one of said neutral contact sections being spaced from the longitudinal center line of said housing opposite said line contact and said at least one of said neutral contact sections being open toward said front face of said housing and with another of said housing and into a second one of said silos on said rear face.

12. An outlet system for plug-in connection of an outlet unit at an outlet site to a selected pair of conductors in a power distribution system containing multiple pairs of conductors, each of said conductor pairs being separately energized for powering an electrical load connected therebetween;

said power distribution system including an insulating housing for enclosing said pairs of conductors, said housing having a longitudinal center line at said outlet site;

said conductor pairs being disposed symmetrically within said housing with respect to said longitudinal center line of said housing, both conductors of each pair being on a common side of said longitudinal center line, one pair being above said longitudinal center line and one pair being below thereof;

said housing having a front face with a plurality of openings therein, one each of said openings being aligned with and providing access to one each of said conductors of said pairs of conductors;

said openings being arranged in first and second groups, the pattern of openings of said first group and the pattern of openings of said second group being symmetrical with respect to one another and to said longitudinal center line and on opposite sides thereof;

said outlet unit comprising:

an insulating housing having a front face and a rear face and including a horizontal median corresponding to said longitudinal center line of said insulating housing of said system upon assembly thereto at said outlet site thereof;

first and second contacts contained within said outlet unit housing and accessible through said front face of said outlet unit housing for receiving mating contacts of a connector attached to an electrical load to be connected across a selected one of said pairs of conductors of said distribution system;

third and fourth contacts projecting from said rear face of said outlet unit housing for engaging the conductors of a selected one of said pairs of conductors within said distribution system housing when said outlet unit is assembled to said distribution system housing, said third and fourth contacts being positioned on said rear face of said housing vertically displaced from said horizontal median of said outlet unit and on a common side thereof, so as to enter the ones of said openings of said first group aligned with the conductors of a first one of said pairs when said outlet unit is assembled to said distribution system housing in a first angular orientation and, upon turning said outlet unit housing end to end for assembly of said outlet unit to said distribution system housing in a second opposed orientation, so as to enter the ones of said openings of said second group aligned with the conductors of a second one of said selected pairs; and means within said outlet unit housing for respectively connecting first and second contacts to said third and fourth contacts.

13. An outlet system as claimed in claim 12, wherein said power distribution system further includes:

a safety ground conductor, and fifth contact means electrically connected to said safety ground conductor said fifth contact means being positioned along said longitudinal centerline of said distribution system housing, and wherein said outlet unit further comprises:

a sixth contact contained within said outlet unit housing and accessible through said front face of said outlet unit housing for receiving a mating contact of a connector attached to a safety ground conductor for an electrical load;

a seventh contact mounted in said outlet housing for engaging said fifth contact means of said distribution system when said outlet unit is assembled to said distribution system housing; and means within said outlet unit housing for electrically connecting said sixth contact to said seventh contact.

14. An outlet system as claimed in claim 13, wherein:

said seventh contact is mounted in said outlet unit housing along said horizontal median of said outlet unit housing, said horizontal median of said outlet unit housing and said horizontal axis of symmetry of said distribution system housing being coplanar when said outlet unit is assembled to said distribution system housing.

15. An outlet system as claimed in claim 14, wherein:

said first and second contacts are positioned in said outlet unit housing in symmetry with respect to said horizontal median of said outlet unit housing.

16. An outlet system as claimed in claim 14, wherein:

said sixth contact is mounted in said outlet unit housing along said horizontal median of said outlet unit housing.

* * * * *

UNITED STATES PATENT OFFICE
CERTIFICATE OF CORRECTION

Patent No. 4,952,164    Dated August 28, 1990

Inventor(s) Ronald M. Weber, Jay L. French, John L. Himes, Jr., James H. Wise

It is certified that error appears in the above-identified patent and that said Letters Patent is hereby corrected as shown below:

In the Claims:

Claim 1, Column 8, Line 58 - replace the word "slice" with the word --silos--.

Claim 5, Column 10, Line 26 - replace the word "positions" with the word --position--.

Claim 5, Column 10, Line 50 - insert the words --said rear face of said housing and into a first one of-- after the word "through".

Claim 11, Column 12, Line 53 - replace the word "form" with the word --from--.

Claim 11, Column 12, Line 67 - insert the words --neutral contacts sections projecting through said rear face of said-- after the word "said"

UNITED STATES PATENT AND TRADEMARK OFFICE
CERTIFICATE OF CORRECTION

PATENT NO. : 4,952,164

DATED : August 28, 1990

INVENTOR(S) : Ronald M. Weber, et al.

It is certified that error appears in the above-identified patent and that said Letters Patent is hereby corrected as shown below:

Claim 12, Column 14, Line 10 - insert the word --said-- after the word "connecting".

Signed and Sealed this

Tenth Day of March, 1992

Attest:

HARRY F. MANBECK, JR.

Attesting Officer

Commissioner of Patents and Trademarks